(12) United States Patent
Bulbow

(10) Patent No.: US 12,053,004 B2
(45) Date of Patent: Aug. 6, 2024

(54) PIG WASTE SILAGE

(71) Applicant: Steve Bulbow, Simi Valley, CA (US)

(72) Inventor: Steve Bulbow, Simi Valley, CA (US)

(*) Notice: Subject to any disclaimer, the term of this patent is extended or adjusted under 35 U.S.C. 154(b) by 0 days.

(21) Appl. No.: 17/969,490

(22) Filed: Oct. 19, 2022

(65) Prior Publication Data
US 2023/0136414 A1    May 4, 2023

Related U.S. Application Data
(60) Provisional application No. 63/274,418, filed on Nov. 1, 2021.

(51) Int. Cl.
*A23K 30/18* (2016.01)
*A23K 10/12* (2016.01)
*A23K 20/163* (2016.01)

(52) U.S. Cl.
CPC .............. *A23K 30/18* (2016.05); *A23K 10/12* (2016.05); *A23K 20/163* (2016.05)

(58) Field of Classification Search
CPC ....................................................... A23K 30/18
See application file for complete search history.

(56) References Cited

U.S. PATENT DOCUMENTS

| | | | | |
|---|---|---|---|---|
| 3,875,304 A | * | 4/1975 | Hunt | A23K 30/15 426/74 |
| 2013/0210101 A1 | * | 8/2013 | Parekh | C12P 7/10 435/165 |

FOREIGN PATENT DOCUMENTS

| | | | | |
|---|---|---|---|---|
| CA | 2757367 A1 | * | 10/2010 | ............. A23K 10/12 |
| CN | 104585532 A | * | 5/2015 | |
| CN | 105211625 A | * | 1/2016 | |
| DE | 2524042 A1 | * | 12/1975 | |
| KR | 20120075905 A | * | 7/2012 | |

OTHER PUBLICATIONS

B.A. Weiner "Swine Waste-Corn Silage and Survival of Dysentery Bacteria" Transactions of the ASAE vol. 27 No. 1 pp. 177-181 1984 (Year: 1894).*

* cited by examiner

*Primary Examiner* — Felicia C Turner
(74) *Attorney, Agent, or Firm* — Michael D. Eisenberg

(57) ABSTRACT

The invention herein is directed to pig waste silage, which is derived from the conversion of pig waste, a fermentable sugar source, and lactic acid fermentable culture, thereby pig waste is transformed into a nitrogen-rich, crude protein concentrate ingredient, suitable for consumption by cattle, sheep, and goat diets. The pig waste silage of the invention herein is a crude protein source that can lower operational costs for cattle and other ruminant producers, by using less protein-based grains, as well as reduction in greenhouse gas emissions, through a better and more efficient digestion of ruminants, based on physiological principles.

16 Claims, 8 Drawing Sheets

Let's Run The Numbers: Average Savings per animal per month: $6.825dls*.(*my local cost), I extrapolated the following:

| Savings with: | Per month: | Per 4mo. Cycle | Per Year |
|---|---|---|---|
| 500 head of cattle, | $3,412dls/mo., | 13,650dls/4mo., | 40,950dls/yr. |
| 1,000 head of cattle, | $6,825dls/mo., | 27,300dls/4mo., | 81,900dls/yr. |
| 5,000 head of cattle, | $34,125dls/mo., | 136,500dls/4mo., | 409,500dls/yr. |
| 10,000 head of cattle, | $68,250dls/mo., | 273,000dls/4mo., | 819,000dls/yr. |
| 20,000 head of cattle, | $136,500dls/mo., | 546,000dls/4mo., | 1,638,000dls/yr. |
| 40,000 head of cattle, | $273,000dls/mo., | 1,092,000dls/4mo., | 3,276,000dls/yr. |
| 50,000 head of cattle, | $341,250dls/mo., | 1,365,000dls/4mo., | 4,095,000dls/yr. |
| 100,000 head of cattle, | $682,500dls/mo., | 2,730,000dls/4mo., | 8,190,000dls/yr. |
| 500,000 head of cattle, | $3,412,500dls/mo., | 13,650,000dls/4mo., | 40,950,000dls/yr. |
| 1M head of cattle, | $6,825,000dls/mo., | 27,300,000dls/4mo., | 81,900,000dls/yr. |

12,210 head of cattle represent an approx. $1,000,000dls/year in savings in soy alone!(full cycle)

With a U.S. Cattle pop. of approx. 94M & a potential national implementation of this process = almost a $7.76Billion dollars in savings/yr. for the cattle producing industry. Cattle farmers would be the new champions in fighting greenhouse gases at a national level while saving an important sum of money in the process!

FIG. 7

| Quantitative Composition | 14 days wet wt. Piglet waste | 14 days dry wt. Piglet waste | 21 days wet wt. gestating sow waste | 21 days dry wt. gestating sow waste |
|---|---|---|---|---|
| Crude Protein. % | 5.63 | 15.54 | 8.43 | 27.99 |
| Crude Fat. % | 2.70 | 7.44 | 2.54 | 8.42 |
| Crude Fiber. % | 1.28 | 3.52 | 2.04 | 6.77 |
| Ash. % | 5.12 | 14.12 | 4.37 | 14.49 |
| Humidity. % | 63.76 | 5.12 | 69.87 | 11.01 |
| Nitrogen-Free Energy. % | 21.51 | 54.26 | 12.75 | 31.32 |
| Calcium. % | 12.83 | 12.83 | 2.04 | 2.04 |
| Phosphorus. % | 3.47 | 3.47 | 1.54 | 1.54 |

FIG. 8

| Pig Waste Silage(PWS) | % | 50Kgs | 100Kgs | 200Kgs | 500Kgs | 1,000Kgs | 2,000Kgs | 5,000Kgs |
|---|---|---|---|---|---|---|---|---|
| * Pig Waste | 91.5 | 45.75 | 91.50 | 183.0 | 457.50 | 915.00 | 1,830.00 | 4,575.00 |
| * Molasses(sugar cane, maple or beets) | 8 | 4.00 | 8.00 | 16.00 | 40.00 | 80.00 | 160.00 | 400.00 |
| * Fresh or Active Dry Milk Whey(reconstituted) or plain yoghurt | 0.5 | 0.25 | 0.50 | 1.00 | 2.50 | 5.00 | 10.00 | 25.00 |
| Total | 100 | 50.00 | 100.00 | 200.00 | 500.00 | 1,000.00 | 2,000.00 | 5,000.00 |
| * Pig Waste | 91.3 | 45.65 | 91.30 | 182.60 | 456.5 | 913.00 | 1,826.00 | 4,565.00 |
| * High Fructose Corn Sweetener(HFCS) | 8.2 | 4.10 | 8.20 | 16.40 | 41.00 | 82.00 | 164.00 | 410.00 |
| * Fresh or Active Dry Milk Whey(reconstituted) or plain yoghurt | 0.5 | 0.25 | 0.50 | 1.00 | 2.50 | 5.00 | 10.00 | 25.00 |
| Total | 100 | 50.00 | 100.00 | 200.00 | 500.00 | 1,000.00 | 2,000.00 | 5,000.00 |
| * Pig Waste | 89.5 | 44.75 | 89.50 | 179.00 | 447.50 | 895.00 | 1,790.00 | 4,475.00 |
| * Ground Corn or ground Sorghum | 10 | 5.00 | 10.0 | 20.000 | 50.00 | 100.00 | 200.00 | 500.00 |
| * Fresh or Active Dry Milk Whey(reconstituted) or plain yoghurt | 0.5 | 0.25 | 0.50 | 1.00 | 2.50 | 5.00 | 10.00 | 25.00 |
| Total | 100 | 50.00 | 100.00 | 200.00 | 500.00 | 1,000.00 | 2,000.00 | 5,000.00 |

Fig. 9

| Species: Bovine(Cattle) | Average % range of inclusion(dry) | Average % range of inclusion(wet) | Species: Sheep & Goats | Average % range of inclusion(dry) | Average % range of inclusion(wet) |
|---|---|---|---|---|---|
| - Calves (150-250Kgs) (4 months or older) | 35-50 | 45-55 | - Spring Lamb (3-6 months old) | 30-35 | 35-45 |
| - Growing (250-350Kgs) | 15-35 | 35-45 | - Yearling (6-12 months old) | 25-30 | 25-35 |
| - Finishing to slaughter(+350Kgs) | 10-15 | 15-20 | - Yearling Mutton (12-20 month old) | 15-25 | 20-25 |
| Cows for Milk Production | 10-15 | 15-20 | - Nursing sheep or goats | 10-15 | 15-25 |

Fig. 10

PIG WASTE SILAGE

CROSS-REFERENCE TO RELATED APPLICATIONS

This application claims priority from U.S. Provisional Application Ser. No. 63/274,418 entitled "Pig Waste Silage", filed on Nov. 1, 2021, which is hereby incorporated herein by reference in its entirety.

FIELD OF THE INVENTION

The present invention relates generally to an anaerobic transformation of pig waste. More specifically, the transformation is through a sugar and lactic bacteria fermentation process that changes the concentration of soluble carbohydrates within the mixture.

BACKGROUND OF THE INVENTION

Climate change has become an increasing concern globally, with many different industries being targeted as potential problems when it comes to the rising amounts of carbon dioxide and other greenhouse gases. Within the food industry, meat producers are faced with two main problems; cattle being criticized for being the main producers of agricultural greenhouse gases and pigs producing large amounts of pig waste that results in environmental issues. Within the US alone there are about 94.8 million cattle each producing an average of 204 kgs of greenhouse gases per year [U.S. 2019 stats.], resulting in 19.3 million metric tons of greenhouse gas emissions per year. Additionally, there are about 77.6 million pigs in the US that each produce about 25.5 kgs of greenhouse gases per year [U.S. 2020 stats.], this translates to about 4.75 million metric tons of greenhouse gases per year from pig waste. Currently, many pork producers use pig waste as organic fertilizer, however this use creates various contamination issues that can cause an oversaturation of organic phosphates on farming land thus, damaging it for future crops.

In order to accomplish this, a preferred embodiment of the present invention comprises a collection stage, a weighing stage, a mixing stage, a fermentation stage, and a dehydration stage. Further, the dehydration stage is optional as the end product can be used fresh or in a dehydrated form that can be stored for longer periods of time. Thus, the present invention provides an eco-friendly, eco-efficient and cost-efficient solution to the way ruminants are currently fed.

SUMMARY OF THE INVENTION

In an aspect, a method for obtaining a pig waste silage comprises: collecting pig waste and fermentable material and fermenting catalyst or cultures; mixing pig waste, the fermentable material, and the fermenting catalyst or cultures, in a container, thereby yielding a heterogenous material, wherein the heterogenous material is fermentable; and fermenting the heterogenous material, thereby yielding the pig waste silage, wherein the pig waste silage is a wet pig waste silage or an additional step can turn it into, dry pig waste silage.

In an aspect, the pig waste silage is dehydrated.

In an aspect, the dehydrated pig waste silage results when broken into smaller pieces and subjected to atmospheric conditions or subjected to a non-heat dehydrator.

In an aspect, the wet pig waste silage is preferable for consumption by 500 or less cattle.

In an aspect, the wet pig waste silage has a shelf-life suitable for consumption for 2.5 months.

In an aspect, the dry pig waste silage has higher levels of nitrogen by weight, in response to dehydrating.

In an aspect, the fermentable material comprises lactic acid culture.

In an aspect, the pig waste silage is derived from the pig waste, and fermentable material comprising a sugar source and a lactic fermenting source, wherein the lactic fermenting source is between 0.495-0.505 parts by weight, the sugar source is 7.5-10.5 parts by weight, and the pig waste is 89.5-91.5 parts by weight.

In an aspect, the pig waste silage is derived from the pig waste and the fermentable material comprising high fructose corn sweetener and a fermentation source, wherein the fermentation source is fresh milk whey, reconstituted active dry milk whey or plain yoghurt with live bacteria cultures.

In an aspect, the pig waste comprises 91.3%, the high fructose corn sweetener constitutes 8.2% and the lactic fermenting source constitutes 0.5% of the pig waste silage, by weight.

In an aspect, the pig waste constitutes 91.5%, the molasses constitutes 8% and the lactic fermenting source constitutes 0.5% of the pig waste silage, by weight.

In an aspect, the pig waste silage is derived from pig waste and fermentable material comprising ground corn or ground sorghum, and a fermentation source, wherein the fermentation source is fresh milk whey, reconstituted active dry milk whey or plain yoghurt with live bacteria cultures.

In an aspect, the pig waste constitutes 89.5%, the ground corn or ground sorghum constitutes 10% and the fermenting source constitutes 0.5% of the pig waste silage, by weight.

BRIEF DESCRIPTION OF THE DRAWINGS

FIG. 7 is a depiction of a chart which characterizes potential savings compared to soy.

FIG. 8 is a depiction of the bromatological analysis of pig waste silage with a corn-based diet FIG. 9 and FIG. 10 are depictions of three variations of the ingredient components of the pig waste silage in different volumes and inclusion of the pig waste silage into different ruminant livestock (herein after; in reference to cattle sheep and goats), respectively.

Figure 1:
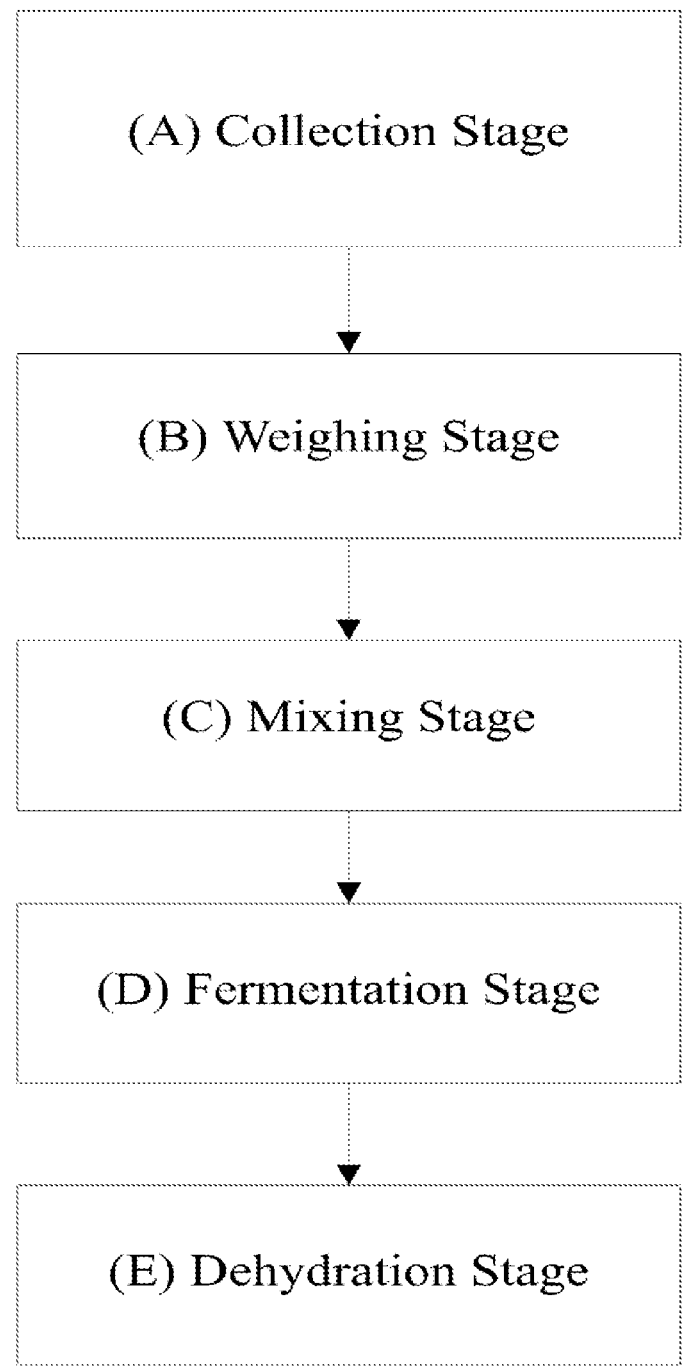
FIG. 1, FIG. 2, FIG. 3, FIG. 4, FIG. 5, and FIG. 6 are depictions of flow charts for obtaining the pig waste silage of the present invention.

All illustrations of the drawings are for the purpose of describing selected versions of the present invention and are not intended to limit the scope of the present invention.

DETAILED DESCRIPTIONS OF THE INVENTION

The present invention is a way to transform pig waste into a high nitrogen, crude protein concentrate for: cattle, sheep, and goat diets, to help lower operational costs for cattle and other ruminant producers, by using less protein-based grains, as well as reduction in greenhouse gas emissions, through a better and more efficient digestion of ruminants. The present invention seeks to provide users with a crude protein source that requires only three ingredients throughout the process. In order to accomplish this the present invention comprises a collection stage where the pig waste, fermentable sugars, and a fermentable lactic acid culture source, is gathered. Further, the various ingredients are weighed out separately, to ensure the correct proportions.

Additionally, the ingredients are mixed together inside of a mixing container. Further, the contents are then loosely sealed and fermented for 21 days. Finally, the fermented contents can be used in its fresh state, or it can be dehydrated, for a higher crude protein content by weight. Thus, the present invention is an innovative solution to the way ruminants are currently fed that is eco-friendly, eco-efficient and cost efficient.

The advantages of the present invention provide beef and pork producers with a method that: (1) helps reduce greenhouse gases; and (2) increases the amount of soy protein that can now be processed for human consumption and food security. The present invention provides pork producers with a method for taking pork waste and transforming it into a high nitrogen, crude protein concentrate (about 26-30% by weight), that can substitute soy or protein-based grains previously used in ruminants, in part of full or it could be standardized and adjusted to 46%, animal grade protein concentrate, with soy, at the processing plant. Going forward, ruminants will refer to: cattle, sheep, and goats. More particularly, the method yields a pig waste silage as a high nitrogen, crude protein concentrate for the ruminant's feed. When consuming the pig waste silage, the cattle eat less volume, are less bloated, produce less flatulent while still being satiated for longer periods of time; and, yet, gain more weight via more efficient digestion that in turn, produces less greenhouse gases. Additionally, the pig waste silage consumed by cows correspond to a faster turnover rate due to more weight gain in as shorter time period than grass fed cattle. Other ruminant livestock consuming the pig waste silage defecate less volume, which corresponds to less manure to ferment on the ground (i.e., less formation of greenhouse gases and less manure volume to clean up). An unforeseen result was, that pig waste silage, tend to tenderize the beef, give it a better visual aspect and a pure, clean flavor.

As shown in FIG. 1, the present invention is a method for creating pig waste silage. The objective of the present invention is to provide users with a crude protein concentrate source, that reduces the amount of greenhouse gases produced by ruminant livestock, while also eliminating pig waste and greenhouse gasses associates with it, reducing operational costs for cattle, sheep, and goat producers, by lowering the feed costs. The present invention intends to provide users with a method that transforms problematic pig waste (which consists of 45% by weight of urine and 55% by weight of feces, wherein only the feces is 10-15% by weight that is made up of solid matter content and 85-90% by weight that is made up of moisture content), into a high nitrogen, calcium/phosphorus rich, protein concentrate, that can be used in ruminant livestock feed, offsetting the need for costly, protein-based grains like soy protein. The method allows for the advantages of recycling the nutrients found in pig waste (e.g., N, Ca, P) and other necessary micro elements, while imparting a lower or acidic pH. The lactic bacteria cultures and the lower pH transforms unpleasant odors, preserves, and modifies the pig waste silage into an advantageous product, thereby eliminating the risk of transmission of pathogenic microorganisms for animal and humans. Due to the low pH fermentation of the method of the present invention, the curing process can be used in animal feed without consequences directed to health, productivity, or product quality.

To accomplish this, the present invention comprises of: a collection stage, a weighing stage, a mixing stage, a fermentation/aging stage, and a dehydration stage, thereby converting pig waste into a consumable, crude protein concentrate source, wherein the crude protein source has higher levels of nitrogen (necessary to make muscle mass in ruminants), according to bromatological analysis results. (See FIG. 8.)

Each stage is completed in sequential order starting with the collection stage and ending with the fermentation stage, wherein the fermentation stage is a curing process that lowers the pH of the intermediate products leading to the pig waste silage and ending product of the pig waste silage. The said intermediate products leading to the pig waste silage and ending product of the pig waste silage, by virtue of the fermentation stage, also help to eliminate bacteria comprising: *Clostridium perfringens, Escherichia coli, Salmonella,* and *Cholerae* suis bacteria; viruses comprising *Aujeszky* and Blue Eye in pigs; and parasitic eggs of *Oesophagostomum dentatum* and *Ascaris suum* (i.e., viruses and parasites exclusive to pigs and non-transmissible to ruminants). After, for example, the intermediate product has been fermented, an additional dehydration stage can be carried out, depending on the desired form of use of the end product of the pig waste silage. Thus, the present invention provides a technical solution to the way cattle and other ruminant livestock are currently fed that is: eco-efficient, eco-friendly, and cost efficient.

Unexpectedly, the fermentation process lowers the pH of intermediate products leading to the pig waste silage and ending product of the pig waste silage, wherein the ending product of the pig waste silage has an odor resembling that of cured or sour olives. In its fresh state and knowing the crude protein content, with a bromatological analysis, the right amount of pig waste silage can be formulated as the protein source, into the feed, replacing in part or full, soy or other protein-based grans. Once mixed, the feed or forage it acquires a sweet and pleasant odor. The lower pH also eliminates microorganisms in the pig waste and it facilitates digestion of the nutrients, due to a slower bowel movement, facilitation in a more efficient absorption of the nutrients in the feed. This slower and more efficient digestion means, there is less fermentable, undigested feed residue that could produce greenhouse gases, such as: methane, carbon dioxide, nitrogen dioxide, and sulfur dioxide.

Figure 2:
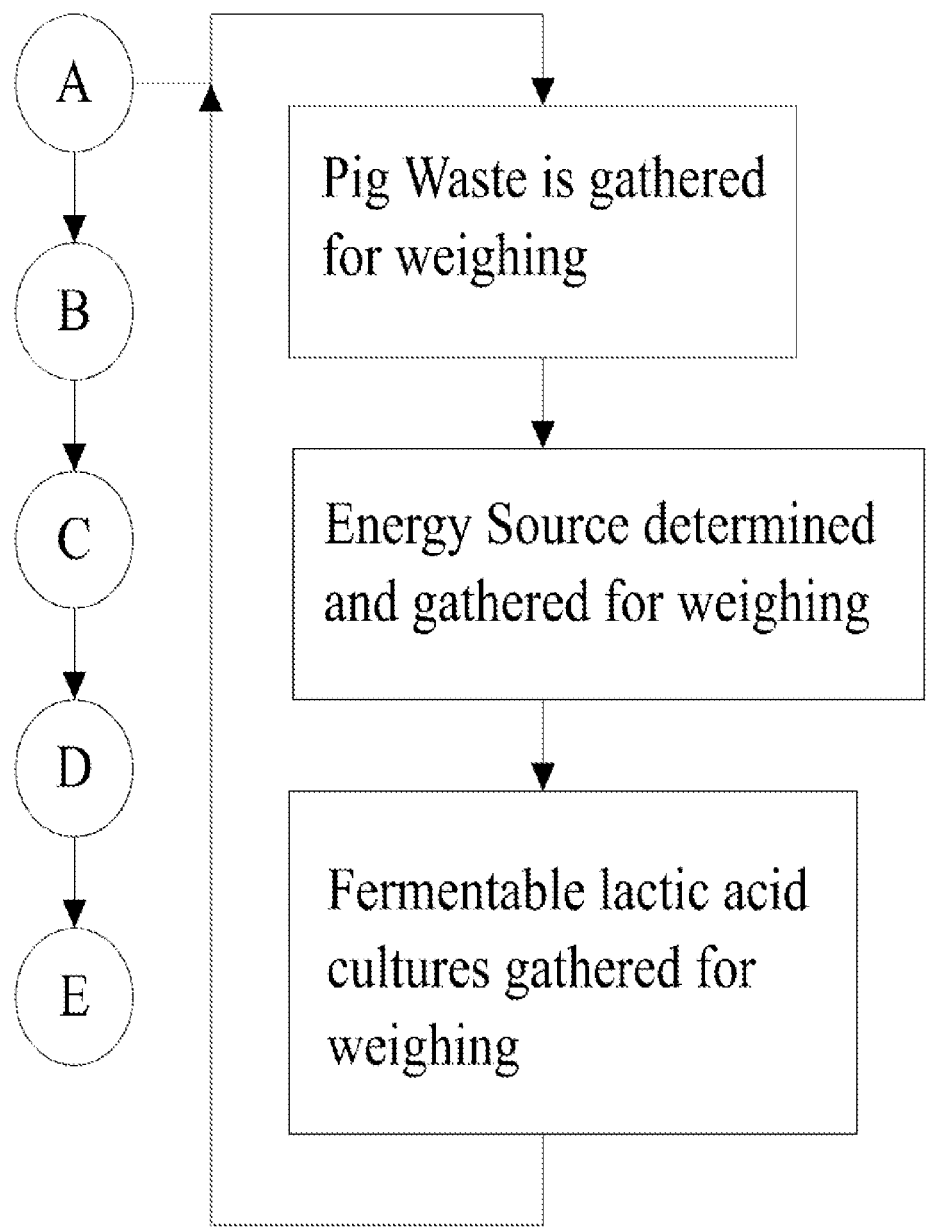

The present invention method starts with the collection stage. The collection stage requires three ingredients to create pig waste silage: relatively fresh pig waste, a sugar or energy source and a fermenting source. In its preferred embodiment as shown in FIG. 2, the energy source uses a high fructose corn sweetener to complete the process. High fructose corn sweetener is a common ingredient that can be found within the United States.

Figure 3:
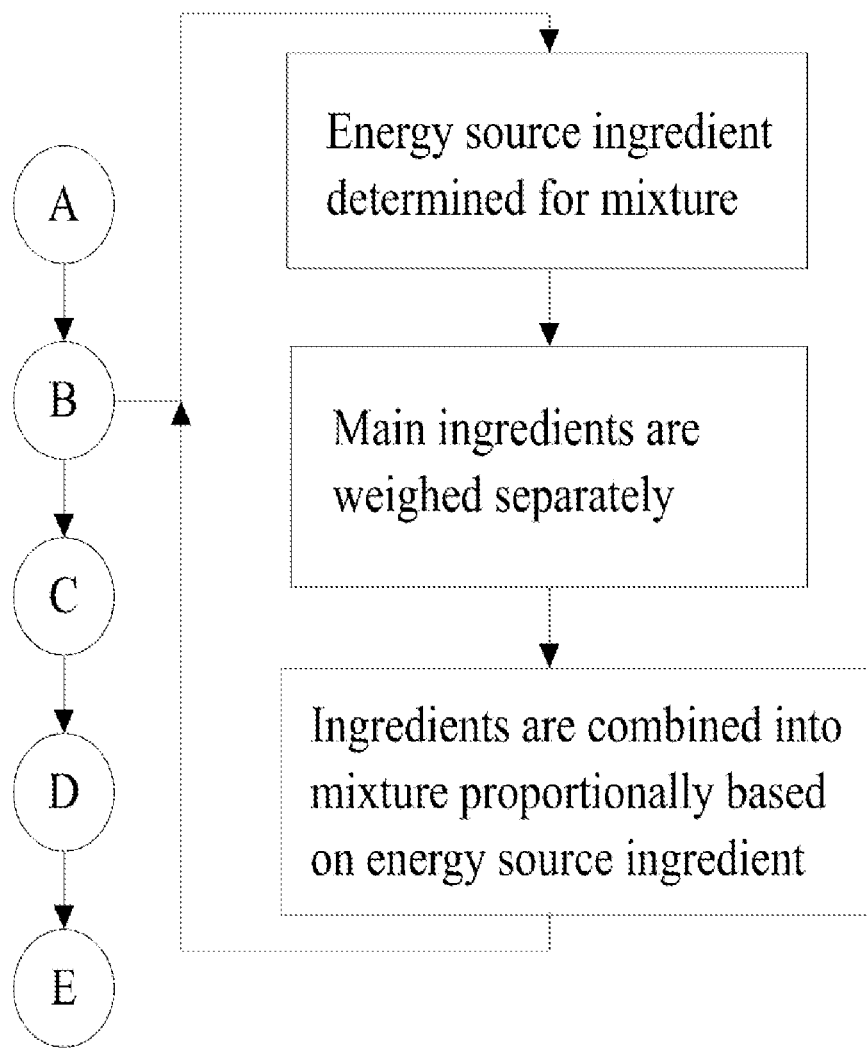

Depending on the geographical location of where the method is taking place, alternative ingredients can be used for the energy source. For example, in Mexico or China, liquid molasses is commonly found and can be made from sugar cane, maple or beets. Furthermore, in Australia, ground corn or ground sorghum can be used as the ingredient for the energy source as these are more readily available. In addition to the pig waste, and a fermentable energy source, a lactic acid bacteria culture source is also needed, such as fresh milk whey, reconstituted active dry milk whey or plain yoghurt with live bacteria cultures. Either can be used as the catalyst ingredient for the present invention. Finally, the pig waste is gathered directly from the animal pens with a preferred age of under 36 hours and no more than 48 hours for processing. It should be further noted that, the energy source ingredient can consist of a variety of different ingredients depending on what is most readily available where the present invention method is being utilized while still staying within the scope of the present invention. After the collection stage the present invention enters the weighing stage. The weighing stage ensures that each ingredient is weighed in exact proportional amounts to provide the optimal nutrient quality for the end result pig waste silage, as seen in FIG. 3.

Figure 4:
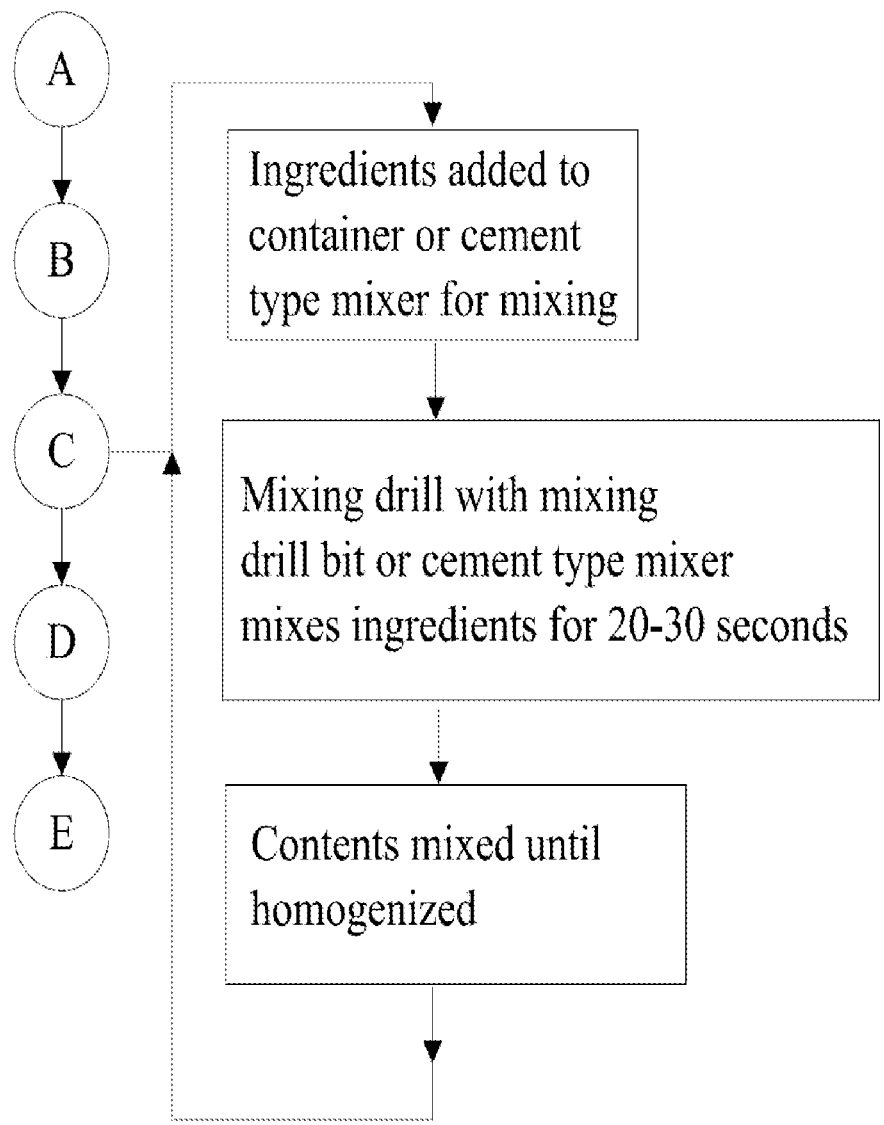

The present invention then starts with the mixing stage shown in FIG. 4, once the weighing stage is complete. The mixing stage takes the three proportionally weighed ingredients and places them to a container. In its preferred embodiment, the various ingredients are then mixed in the plastic container with a standard high amp, low revolution drill and a mixing drill bit for 20 to 30 seconds. In an alternative embodiment the contents can be mixed with a portable, electric cement type mixer for 20 to 30 seconds. The mixing is designed to homogenize the contents within the container and to provide a uniform fermentation of the pig waste. Additionally, if the mixture is of a larger volume (>50 kgs), the ingredients can be mixed within an electric portable cement mixer. Furthermore, the containers are filled to a maximum of 70% of the container volume, to avoid any overflow or pressure within the drums, during the first 24 hours. The final mixture should resemble a consistency of a thick sludge that is not too wet or too dry, indicating that it is ready for the fermenting and aging stage. For smaller volumes, the pig waste can be stored, loosely lidded, and labeled, in the same reusable plastic drums, where the mixing occurred. Metal drums are not suitable, due to the acidity of the pig waste silage fermenting process, which can rot the metal drums. For larger volumes, it can be poured into bunker type trenches or masonry, in a shaded area and permanently covered for the 21-day fermentation/aging process, with a reusable black plastic sheet, for the duration of the fermentation/aging stage. The fermentation stage is induced by the lactic bacteria present in the fresh milk whey or reconstituted active dry milk whey or plain yoghurt with live bacteria cultures, in conjunction with the fermentable sugars. In its preferred embodiment, the fermentation stage has a temperature range of approximately 35 to 37 degrees Celsius the first 1-2 days, the other 19 to 20 days, it acquires a room temperature and is the aging process, with a humidity of around 60% to 70%. The pH starts to decrease, thereby the scent of the pig waste silage will be vinegary, resembling the odor sour or cured olives. When humid or wet pig waste silage is added to the forage or feed, the mixture of the two will become warmer due to the difference in nitrogen content. After 24 hours, the combined pig waste silage and forage/grains will have a cooler temperature than that of ambient air, the lower pH will help to inhibits fungal activity, which is toxic to farm animals. The pig waste silage should be submitted to a routine bromatological analysis, to determine crude protein content, for formulating different nutritional values of feed for different stages of production (see FIG. 8, which is a Bromatological analysis of pork waste silage with a corn-based diet (i.e., piglet and gestation sow waste comparison)). Note: The bromatological analysis of piglet waste was included for comparison purposes only and due to its deficient nutritional value, it is not used in processing pig waste silage.

Figure 5:
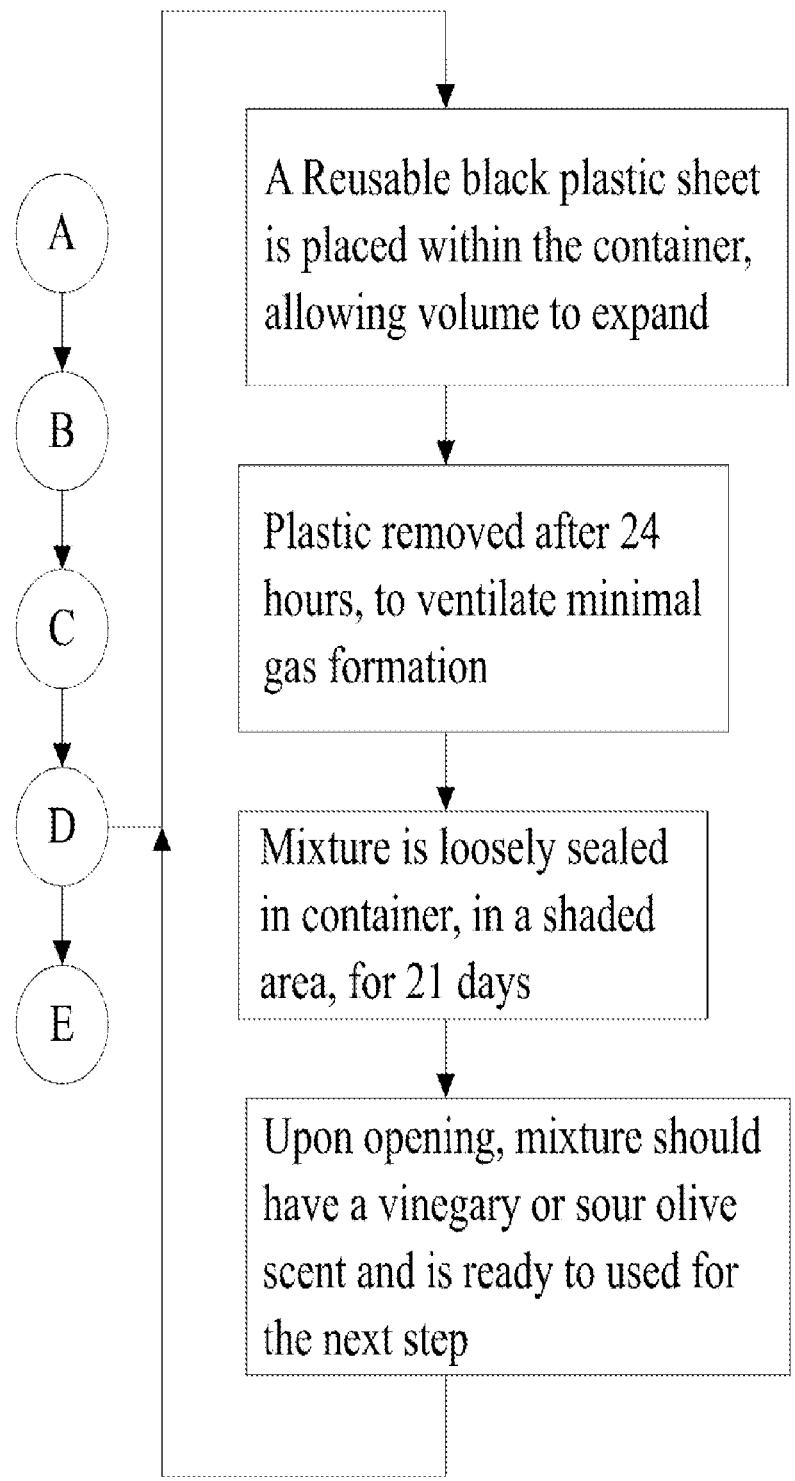

As shown in FIG. 5, the contents within the container are loosely sealed for a minimum of 14 days, ideally 21 days, for a greater crude protein content and to thwart off all viability of potential pathogens. Also see FIG. 8 for crude protein, crude fat, crude fiber, ash, humidity, nitrogen-free energy, calcium, and phosphorous, as percentage by weight, at 14 and 21 days. Before the contents are sealed the surface of the mixture is covered with a layer of reusable black plastic sheet the size of the interior of the container, allowing the volume of the mixture to expand for one day. Afterwards the plastic is removed allowing the minimal gas formation to ventilate, after which the plastic is then replaced before sealing for aging. Once the container is loosely sealed, it is marked with the processed date and amount prepared, to track usability date and volume availability. Preferably, the fermentation stage is aged for 21 days for the optimal crude protein count, however the container may be opened after only 14 days for use, with a lower crude protein count. It can last for up to 2.5 months from the processed date in the unopened containers in its fresh state, away from sunlight. Once the fermentation stage is complete and ready for use, the pig waste silage should give off a strong vinegary or cured olive scent, indicating proper fermentation and can be used within the next stage.

The dehydration stage is an optional step after the fermentation stage to yield the pig waste silage has been successfully completed. Once the present invention has finished the fermentation stage, the pig waste silage can be mixed with the forage meal and adjusted to create the desired amount of protein concentrate, while also making use of N, Ca, and P. This fresh use of the pig waste silage is preferable for 500 or less cattle and can last for 2.5 months from the processed date. If the pig waste silage is to be used at a larger scale like, industrial level production, then the fermentation product is dehydrated during the dehydration stage, to produce a dry pig waste silage. The benefits of dehydrating the mixture, is that the Pig Waste Silage has less water weight to transport, a higher nitrogen content by weight, and a longer shelf life of around 9 to 12 months.

Figure 6:
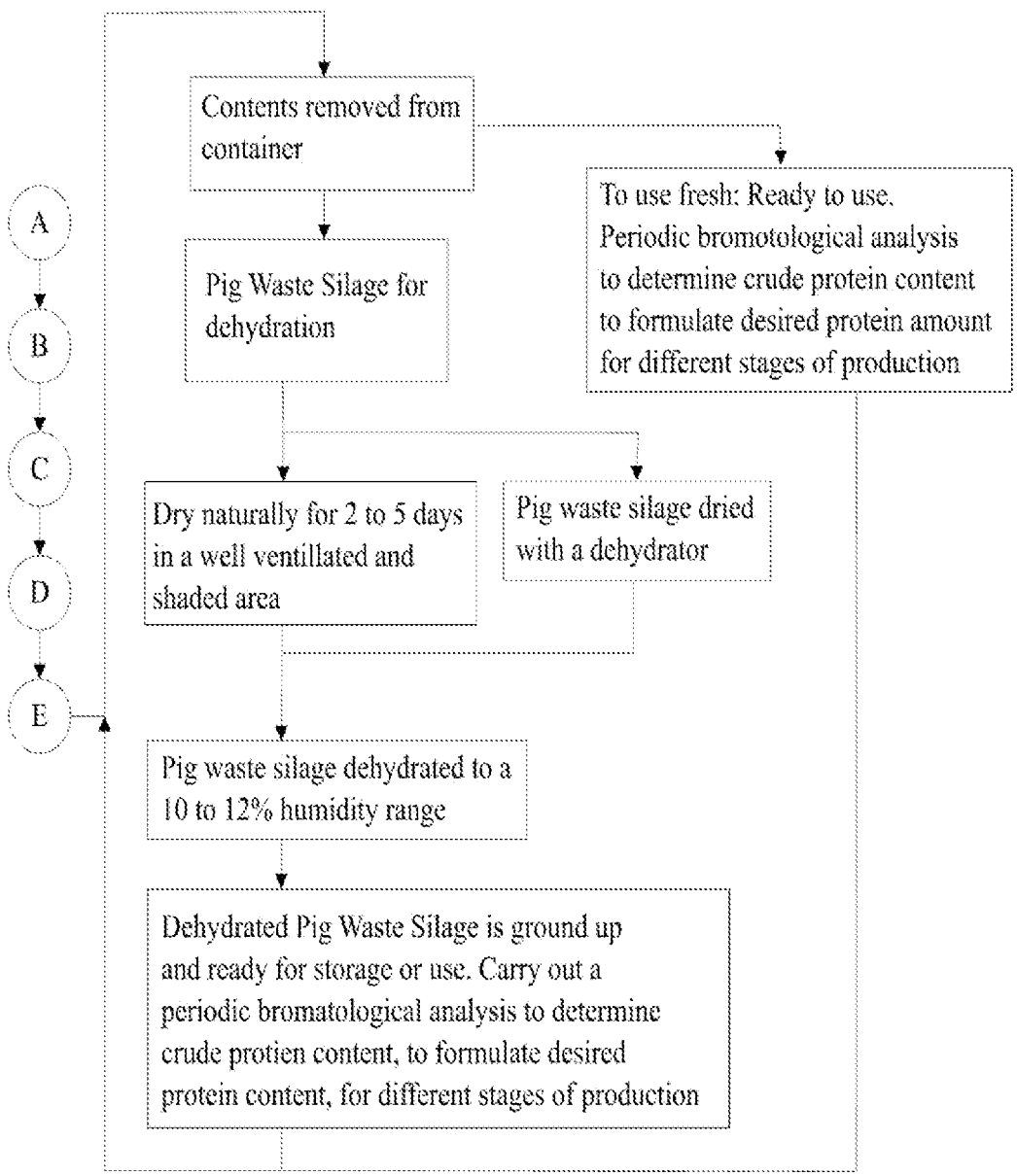

The Pig Waste Silage can be dehydrated in two forms, as seen in FIG. 6. Either naturally, where it is uncovered, broken into smaller pieces, moved around, and let to dry naturally, in a shaded, well-ventilated area for 2 to 5 days (e.g., atmospheric conditions). Depending on the silage thickness and environmental factors, this step has no additional costs. An alternative method is to dehydrate the Pig Waste Silage with a dehydrator, which takes less time to complete. The setback is the added cost of electrical energy to power the dehydrator. In either form, the Pig Waste Silage is dehydrated to approximately 10% to 12% humidity. After the pig waste silage is dehydrated to its optimal level, it is then ground up in a mill and stored in sacks or silos for future use. With all the components working in tandem with each other, it can be seen that the present invention is a technical solution is provided to the way cattle and other ruminants are currently fed that is: eco-efficient, eco-friendly, and cost efficient.

With respect to the processing aspects (i.e., functional aspects) for obtaining the pig waste silage, options 1, 2, and 3 produce the greatest volume of pig waste. the pig waste silage is derived from the pig waste, and fermentable material comprising a sugar source and a lactic fermenting source, wherein the lactic fermenting source is 0.5% by weight, the sugar source (depending on the energy source used) is 8.0%-10% by weight, and the pig waste is (depending on the energy or sugar source used) 89.5-91.5% by weight in relation to preparation of 100 kg of the pig waste silage. Options 1, 2, 3 are described in more detail below.

In option 1, the pig waste silage can be within a percentage range of 90.59 to 92.42 kg, by weight of pig waste; 7.92 to 8.08 kg by weight of molasses; and 0.495 to 0.505 kg by weight of milk whey.

In option 2, the pig waste silage can be within a percentage range of 90.39 to 92.21 Kgs by weight of pig waste; 8.12 to 8.28 kg by weight of HFCS; and 0.495 to 0.505 Kgs by weight of plain yoghurt.

In option 3, the pig waste silage can be within a percentage range of 88.61 to 92.40 kg by weight of pig waste; 9.90 to 10.1 kg by weight of ground corn and/or sorghum; and 0.495 to 0.505 kg by weight of RADMW.

Note: Plain yoghurt, Milk whey and RADMW are understood to containing live/active bacteria cultures; RADMW is Reconstituted Active Dry Milk Whey. Corn and/or sorghum are in ground up form.

With respect to the compositional aspects (i.e., structural aspects) of the pig waste silage, the lactic fermenting source can be between 0.4-0.6% by weight of the total mixture for the obtained pig waste silage. More particularly, the lactic fermenting source can be 0.4, 0.5, and 0.6%, by weight of the total mixture for preparing the pig waste silage. If enough lactic fermenting source is not added, then the resulting pig waste silage does not exhibit a sufficient acidic fermentation process or positive, odor perception changes and an unforeseen or unwanted, decomposition could arise, ruining the end product. If too much lactic acid fermenting source is added, then the resulting pig waste silage exhibits an effect akin to Alka-Selzer in soda expansion.

With respect to the compositional aspects (i.e., structural aspects) of the pig waste silage, the sugar sources (molasses, high fructose corn sweetener (HFCS), or ground corn/sorghum) can be between 7.5-10.5% by weight of the total mixture for the obtained the pig waste silage. More particularly, the sugar sources can be 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5% by weight of the total mixture for preparing the pig waste silage. These ranges facilitate a fermentation process that imparts the acidic pH, as described above, into the pig waste silage.

EXAMPLES

Below are actual experiments reduced to practice using the methods described above to facilitate a more complete understanding of the present invention. These are in no way to be construed as the only examples reduced to practice.

Example 1

The ingredient weights were determined by the energy source ingredient used within the collection stage. In its preferred embodiment, the mixtures stage for conversion into the pig waste silage utilized a mixture of pig waste, high fructose corn sweetener, and a fermentation source. The fermentation source can be fresh milk whey or reconstituted active dry milk whey or plain yoghurt. Within this preferred mixture, the pig waste constituted 91.3%, the high fructose corn sweetener constituted 8.2% and the lactic fermenting source constituted 0.5% of the total mixture, by weight. In an alternative embodiment, the mixture stage for conversion into the pig waste silage utilized a mixture of pig waste, molasses, and a lactic fermenting source. Within this alternative mixture the pig waste constituted 91.5%, the molasses constituted 8%, and the lactic fermenting source constituted 0.5% of the total mixture, by weight. In another alternative embodiment the mixture stage utilized for conversion into the pig waste silage utilized a mixture of: pig waste, ground corn or ground sorghum, and a fermentation source. Within this alternative mixture, the pig waste constituted 89.5%, the ground corn or ground sorghum constituted 10% and the fermenting source constituted 0.5% of the total mixture, by weight. The method herein was modulable, based on the energy source ingredient, thereby allowing for various proportions to be utilized for the present invention depending on the most easily accessible ingredients depending on geographical area.

Example 2

Users of the methods of the present invention were able to obtain a very cheap or inexpensive crude protein source that used only three ingredients, i.e., the pig waste silage. More particularly, the crude protein source and process for obtaining said crude protein source were applied for countries where swine production was carried out and can be adjusted to a constant schedule production, based on pig waste availability. For example, the process to obtain the crude protein source costed between $0.017 (USD), $0.026 (USD), and $0.025 (USD) per kilogram for the options 1, 2 and 3, respectively, of the mentioned invention (as also describe above). Pig waste silage was the crude protein source containing nitrogen, wherein nitrogen is required for ruminants (cows, sheep & goats) to make muscle mass. Compared to soy protein, the crude protein source had a lower protein content (approx. 46.18% vs. 46.00%), at a ratio of 1.65 pig waste silage to 1 of soy protein. Even at this ratio, the pig waste silage was still 21 times CHEAPER than soy protein, while also functionalizing raw untreated pig waste (contaminant) into a transformed and recycled product (i.e., crude protein source within pig waste silage). Average savings per different number of cattle in different timeframes and based on soy price equivalence, were listed in FIG. 7.

Example 3

Animal livestock was fed with the pig waste silage. Initially (T=0-24 hours), the animal livestock nibbled on the pig waste silage due to be accustomed to their new feed. By the second day (T=24-48 hours), the animal livestock started to consume the pig waste silage more frequently. By the third day (48-72 hours), the pig waste silage was adopted as the new feed concentrate, instead of balance feed formulations with corn, corn stalks and soy. More particularly, sheep changed their consumption habits within less than a 7-day timeframe when consuming the pig waste silage as the protein component of their feed, which was also accompanied with not "baaing" prior to a next feed, which is a sign of being satiated and no visual bloating. Also, higher weight gain than grass fed sheep. Cattle also changed their consumption habits within less than a 7-day timeframe when consuming the pig waste silage, which was also accompanied with not "mooing" prior to a next feed, feeling satiated, no bloating, and higher weight gain than grass fed cattle. Additionally, the sheep and cattle fed the pig waste silage (as obtained by the method of the present invention), were less flatulent and excreted less dung. The effect of the pig waste silage on the cattle and sheep led to higher quality slaughter products, whereby the marbling was extremely white and tender. The meat was absent of: (1) undesired aromas and/or (2) rancid taste, thereby producing a better-quality meat than commercially available. Across different races of cattle, the slaughter products were uniformly the same in terms of a product whereby the marbling was extremely white, tender, that was absent of: (1) undesired aromas and/or (2) rancid taste. See FIG. 9 for the different scenarios of ingredient percentages to make pig waste silage; and FIG. 10 for percent of inclusion of pig waste silage (as described in FIG. 9), for different livestock animals. The inclusion of pig waste silage can be adjusted to specific crude protein requirements, depending on specific stages of production, and based on protein content, determined by a periodic Bromatological analysis.

Although the invention has been explained in relation to its preferred embodiment, it is to be understood that many other possible modifications and variations can be made without departing from the spirit and scope of the invention and adjustable to availability of local resources in a determined geographical location.

What is claimed is:

1. A method for obtaining a pig waste silage, comprising a crude protein concentrate, wherein the method comprises:
    collecting pig waste which comprises pig feces, a fermentable material, and a lactic acid bacteria culture source which is live and comprises at least one of: fresh milk whey, reconstituted active dry milk whey, and plain yoghurt;
    mixing the pig waste, the fermentable material, and the lactic acid bacteria culture source, in a container, thereby yielding a heterogenous material, wherein the heterogenous material is fermentable; and
    fermenting the heterogenous material for a time period selected to raise a level of crude protein in the heterogenous material therereby yielding the pig waste silage which is tailored for consumption by ruminants.

2. The method of claim 1, wherein the pig waste silage is dehydrated.

3. The method of claim 2, wherein the dehydrated pig waste silage results when broken into smaller pieces and subjected to atmospheric conditions or subjected to a dehydrator.

4. The method of claim 1, wherein the pig waste silage is suitable for wet preparation and consumption, by 500 or less cattle.

5. The method of claim 1, wherein the west pig waste silage has a shelf-life suitable for consumption for 2.5 months.

6. The method of claim 2, wherein the dehydrated pig waste silage has higher levels of crude protein by weight, in response to dehydrating.

7. The method of claim 1, wherein the pig waste silage is derived from the pig waste, the fermentable material comprising an energy source, and the lactic acid bacteria culture source, wherein the lactic acid bacteria culture source is 0.5 parts by weight, the energy source is 8.0-10.0 parts by weight, and the pig waste is 89.5-91.5 parts by weight.

8. The method of claim 1, wherein the fermentable material comprises high fructose corn sweetener.

9. The method of claim 8, wherein the pig waste comprises 91.3%, the high fructose corn sweetener constitutes 8.2%, and the lactic acid bacteria culture source constitutes 0.5% of the pig waste silage, by weight.

10. The method of claim 8, wherein the pig waste constitutes 91.5%, the molasses constitutes 8% and the lactic acid bacteria culture source constitutes 0.5% of the pig waste silage, by weight.

11. The method of claim 1, wherein the fermentable material comprises ground corn or ground sorghum.

12. The method of claim 11, wherein the pig waste constitutes 89.5%, the ground corn or ground sorghum constitutes 10%, and the lactic acid bacteria culture source constitutes 0.5% of the pig waste silage, by weight.

13. The method of claim 1, wherein fermenting the heterogenous material comprises fermenting the heterogenous material in a loosely sealed container for 14 days to 2.5 months.

14. The method of claim 1, wherein fermenting the heterogenous material comprises fermenting the heterogenous material in a loosely sealed container for 21 days.

15. The method of claim 1, wherein the time period is selected for raising a level of crude protein in the heterogenous material, to produce the pig silage having to at least 8.43% of crude protein by weight at the end of fermentation.

16. The method of claim 15, further comprising:
    dehydrating the pig silage to obtain dehydrated pig silage having at least 27.99% of crude protein by weight.

* * * * *